United States Patent [19]

Mehoudar

[11] 4,215,822
[45] Aug. 5, 1980

[54] DRIP LEVEL IRRIGATION

[75] Inventor: Raphael Mehoudar, Tel Aviv, Israel

[73] Assignee: Hydro-Plan Engineering Ltd., Tel Aviv, Israel

[21] Appl. No.: 970,171

[22] Filed: Dec. 18, 1978

Related U.S. Application Data

[63] Continuation of Ser. No. 604,840, Aug. 14, 1975, abandoned.

[30] Foreign Application Priority Data

Aug. 14, 1974 [IL] Israel ................................. 45468
Apr. 25, 1975 [IL] Israel ................................. 47172

[51] Int. Cl.³ .............................................. B05B 1/02
[52] U.S. Cl. ..................................... 239/542; 138/42; 239/547; 239/600
[58] Field of Search ........................ 239/266–269, 239/271, 272, 542, 547, 600; 138/40–46; 285/13, 14; 405/36, 43, 44, 49, 51

[56] References Cited

U.S. PATENT DOCUMENTS

| 3,729,142 | 4/1973 | Rangel-Garza et al. | 239/542 |
|---|---|---|---|
| 3,792,588 | 2/1974 | Gilaad | 285/14X |
| 3,870,236 | 3/1975 | Sahagun-Barragan | 239/542 X |
| 3,873,030 | 3/1975 | Barragan | 239/542 |
| 3,958,761 | 5/1976 | Watanabe | 239/542 |

Primary Examiner—Andres Kashnikow
Attorney, Agent, or Firm—Browdy and Neimark

[57] ABSTRACT

An emitter unit comprises a wall defining an elongated flowpath, an inlet and an outlet for the unit, a connector for coupling the unit to an irrigation installation, two sets of oppositely directed baffles projecting into the flowpath, characterized in that each baffle terminates in a baffle tip of a width $\xi$ where $0 < \xi < 0.25\Delta$ where $\Delta$ is the minimum throughflow spacing in the emitter, the baffles of one set being respectively directed towards the inter-baffle regions of the opposite set, the tip of each baffle being substantially aligned with the tips of the opposite pair of adjacent baffles.

19 Claims, 14 Drawing Figures

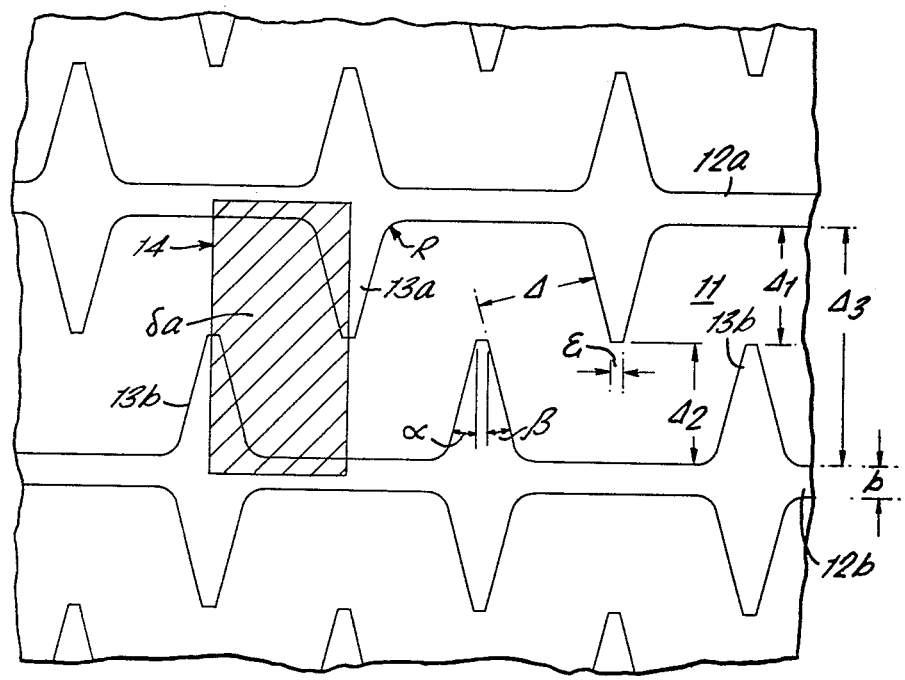
FIG. 1.
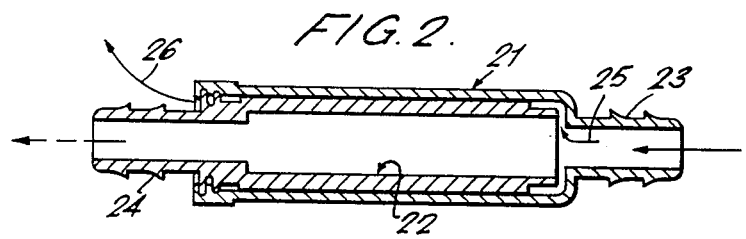
FIG. 2.
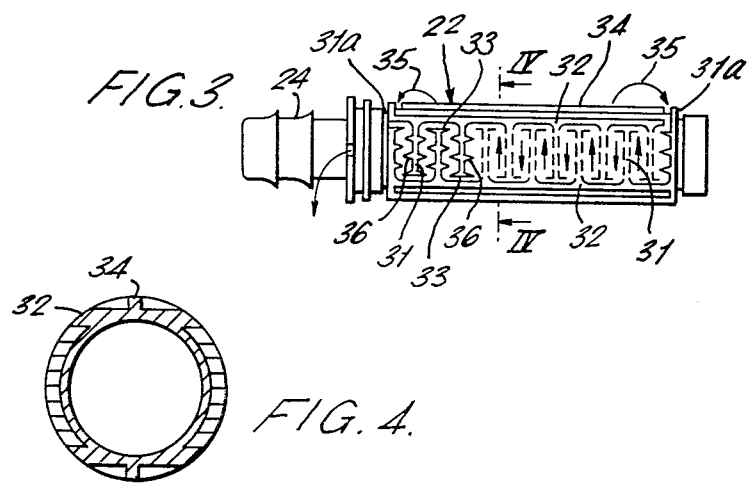
FIG. 3.
FIG. 4.

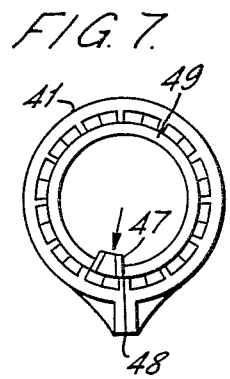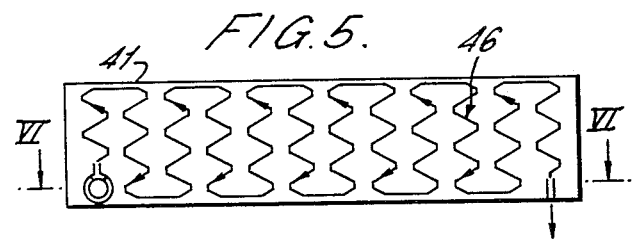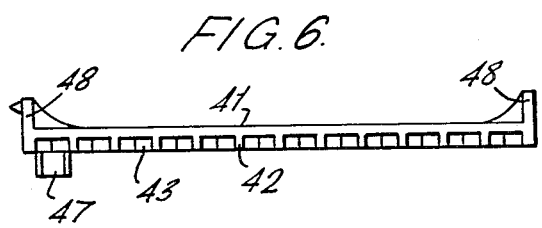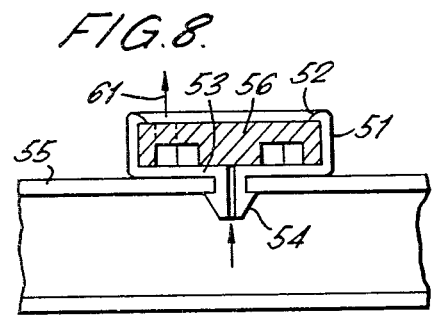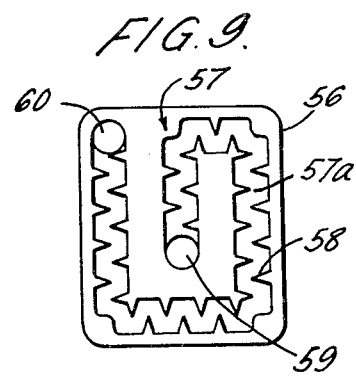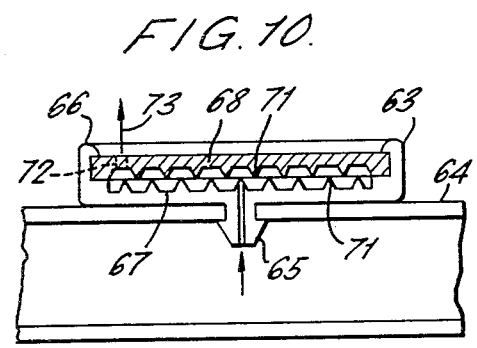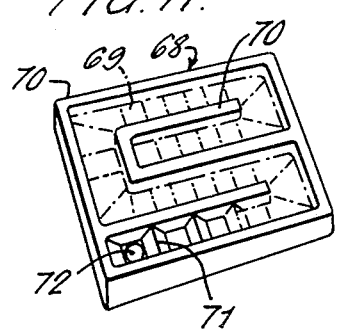

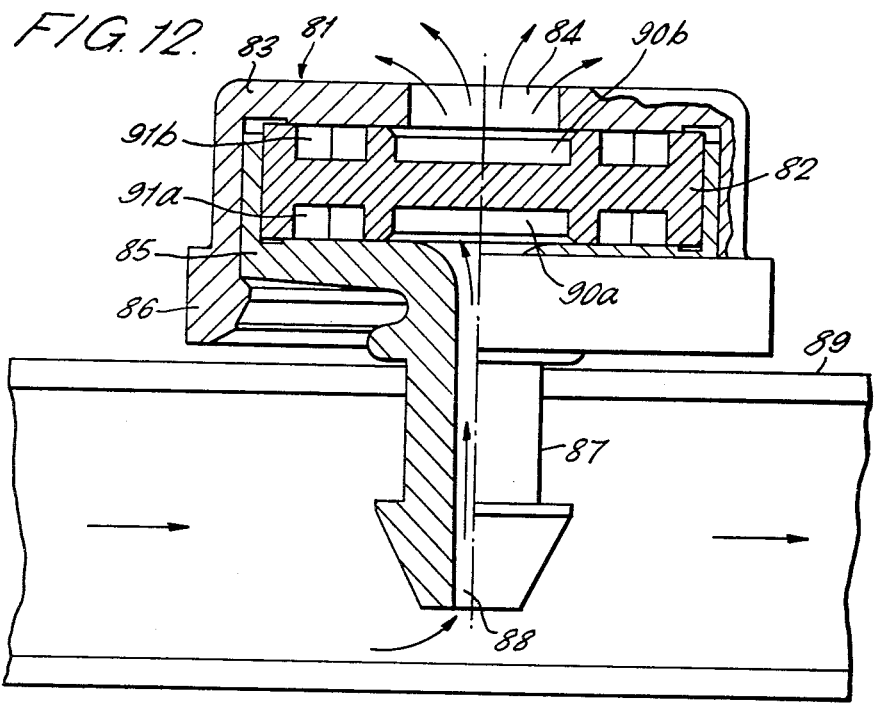
FIG. 12.
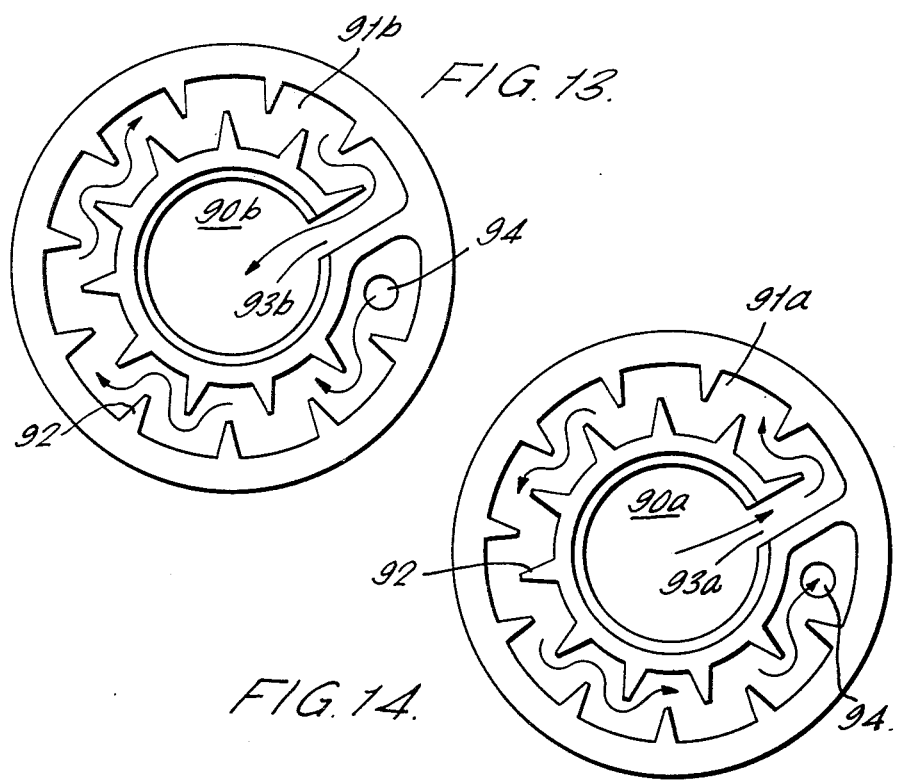

DRIP LEVEL IRRIGATION

This is a continuation of application Ser. No. 604,840 filed Aug. 14, 1975, now abandoned.

This invention relates to drip level irrigation and is particularly concerned with drip level irrigation or emitter units capable of being fitted to irrigation systems so as to ensure a drip-like level of discharge at a very low rate of flow and at the required locations.

Drip level irrigation is being more and more employed throughout the world, it having been accepted that this form of irrigation is not only desirable from the point of view of water economy but is also beneficial to the plants being irrigated.

The main problem to be solved when designing a drip level irrigation installation is essentially how a drip level output is to be achieved given a relatively high supply pressure. This problem becomes more acute the higher the initial supply pressure. It is clear, however, that this problem cannot be resolved by merely reducing this initial supply pressure seeing that it is necessary to ensure that, where the installation extends over a substantial area, with possibly differing terrain gradients, water still reaches all regions of the installation and at a substantially uniform rate, despite these gradients and pressure losses in the lines themselves. This can only be ensured if the supply pressure through the system is considerable as compared with the pressure differences due to the terrain and the pressure losses in the lines. Thus, if in practice the magnitude of pressure variations due to differing gradients as well as to pressure losses in the lines were to exceed 20% of the magnitude of the supply pressure, there would be very substantial variations in the outflow rates.

Various proposals have been made to achieve such an effective drip level discharge with a sufficiently high supply pressure. In accordance with one such set of proposals the reduction in supply pressure so as to obtain the drip-like discharge is achieved by forcing the irrigating liquid to pass through very small discharge outlets or apertures, the smaller the outlet aperture the lower the flow rate for a given supply pressure. A proven disadvantage of this set of proposals arises from the very smallness of the discharge outlets, which smallness leads to their becoming blocked as a result of the presence of grit or other impurities in the irrigating liquid or as the result of ingress of grit or sand from the surrounding area. This danger has hitherto placed a lower limit on the dimensions of the discharge outlets of such drip level installations.

These disadvantages have led to the development of a further set of proposals in accordance with which the flow rate is reduced as a result of the passage of the outflowing irrigating liquid along elongated outflow paths and as consequence of the frictional resistance to flow experienced by the irrigating liquid along these outflow paths. With such a construction the actual outlet apertures can be substantially greater than is the case wherein the entire reduction in flow rate is effected as a result of flow through a restricted outlet aperture.

Drip level irrigation units based on these constructions are generally formed of a pair of coaxial tubular members which interfit and which define between them these elongated outflow paths, each unit being formed with an inlet and an outlet which communicate via the outflow path(s), the inlet also communicating with an irrigation supply pipe. Such a unit can be coupled in series with a main irrigation supply pipe with the inner tubular member effectively constituting a part of the main supply pipe through which the main supply flow passes, a portion being directed so as to pass through the outflow path(s) of each unit and so as to emerge therefrom as a pressureless drip. Such a unit is referred to as an in-line dripper. Alternatively the unit can be formed entirely separately of the main supply flow line and has its inlet coupled thereto by means of a branch duct which can be of any desired length and flexibility. Such a unit is referred to as a branch dripper. Drip level installations and units designed in accordance with this further set of prior proposals show distinct advantages in operation over those designed in accordance with the first mentioned set.

With such units however the reduction in the flow rate is a direct consequence of the frictional resistance to flow, which, in its turn is a function of the total length of the outflow paths. There is however clearly an upper limit on the length of these paths with units of practical sizes and this limit introduces, in its turn, a limit on the effective reduction of flow rate. Furthermore with such units the flow along the elongated outflow paths tends to be largely laminar and the outputs from such units are very sensitive to variations in the supply pressure.

The present invention is based on the results of a novel analysis of the factors which govern the attaining of an adequate pressure loss by flow through an emitter unit of a liquid, initially at an elevated supply pressure, and its being subjected to successive encounters with resistance elements.

Let us first define the following parameters which will be considered in this analysis:

$H$ = liquid flow pressure at which the liquid enters the emitter unit and therefore constitutes the pressure drop to be attained by flow through the unit if the outflow is to be at substantially zero pressure;

$Q$ = rate of outflow of liquid from the emitter;

$K$ = an emitter constant which is characteristic of the liquid throughflow in the emitter as a whole;

$\delta k$ = elementary emitter constant per resistance element;

$n$ = number of resistance elements in the emitter;

$V$ = average speed of liquid flow through the minimal flow cross-section in the emitter;

$A$ = area of the minimal flow cross-section in the emitter;

$a$ = total area occupied by the flowpath and resistance elements;

$\delta a$ = unitary area element occupied by adjacent contributory portions of a pair of resistance elements and the intermediate space;

$\Delta$ = minimum throughflow spacing in the emitter.

In a typical case of a square flow cross-section it can be assumed that:

(i) $A = \Delta^2$
(ii) $a = n\delta a$ and it is known that
(iii) $K = n\delta k$
(iv) $V = Q/A$ $$H = K(V^2/2g) \quad (1)$$

and therefore substituting relationships (i) and (iv) in formula 1 we get $$H = K(Q^2/2g\Delta^4) \quad (2)$$

$$\Delta = \sqrt[4]{K(\sqrt{Q}/\sqrt[4]{2gH})} \quad (3)$$

Now for given outflow rate Q and liquid flow pressure H ($\sqrt{Q}/\sqrt[4]{2gH}$) can be considered as a constant $$\Delta = \sqrt[4]{K} \text{-constant} \quad (4)$$

Now it is clear that the greater $\Delta$ the less the likelihood of the throughflow path in the emitter becoming blocked and so it is desirable to have $\Delta$ as large as possible and this carries with it the consequence that K should be as large as possible. It will be realised however that a slight increase in $\Delta$ is accompanied by a very substantial increase in K.

In order however to ensure maximum value for K it is clear from relationship (iii) that n·$\delta$k should tend to maximum. From relationships (ii) and (iii) we have that $K = a(\delta k/\delta a)$ and seeing that for a given emitter a is a constant $\delta k/\delta a$ must tend to a maximum and therefore $\delta a$ should tend to a minimum and $\delta k$ should tend to a maximum.

It is an object of the present invention to provide an emitter unit having a flowpath defined by a specific configuration of resistance elements such as to satisfy simultaneously the requirement for a maximum $\delta k$ and a minimum $\delta a$ and which are of adequate mechanical strength, the unit being capable of ready manufacture from standard and non-expensive plastic materials.

In accordance with the present invention there is provided an emitter unit comprising wall means for defining an elongated flowpath, an inlet and an outlet for said unit, means for coupling the unit to an irrigation installation, two sets of oppositely directed baffles projecting into said flowpath, characterised in that each baffle terminates in a baffle tip of a width $\xi$ where $0 < \xi < 0.25\Delta$ where $\Delta$ is the minimum throughflow spacing in the emitter, the baffles of one set being respectively directed towards the inter-baffle regions of the opposite set, the tip of each baffle being substantially aligned with the tips of the opposite pair of adjacent baffles.

The alignment of the baffles can be rectilinear or along a gentle curve.

The specific configuration of resistance elements having baffle tips as defined above and in accordance with the invention results directly from the requirement for a minimum $\delta a$ and, simultaneously, a maximum $\delta k$ and allows for the achievement of a maximum $\Delta$ within a given area a.

Whereas, theoretically the baffle as a whole should be of minimal width, such a construction is in practice impossible to achieve and it is found sufficient for the baffle tips to be within the maximum range defined above, the baffle body dimensions being dictated by the requirement to have $\Delta$ maximal whilst at the same time keeping a sufficiently low for the unit to be a practical and economic possibility. In practice it is found that the optimal construction for the baffle is a substantially triangular tooth-shaped construction having an apical width which is preferably of the order of 0.1$\Delta$, the side walls of the baffle defining between them an angle which preferably lies within the range 10°-35°.

It has been proposed (U.S. Patent No. 3,792,588) to provide a dripper or emitter unit with interconnected, axially directed outflow grooves which are, in their turn, subdivided by laterally extending ribs or baffles so as to form a maze-like groove in which the throughflowing water, when encountering each lateral rib or baffle (constituting "resistance elements") is subjected to a change of directional flow and these successive changes introduce a resistance to flow which cumulatively results in a pressure loss whereby the outflow from the unit should be as a substantially pressureless drip. This proposal makes use of a concept which had long been known in which the interposition of baffles as a means for introducing resistance to fluid flow was considered. With the unit as disclosed in the U.S. patent specification, it has nevertheless been established that, in order to achieve a substantially pressureless outflow, a very substantial number of changes in directional flow must be achieved and this in its turn requires the provision of a substantial number of resistance elements. In order to accommodate such a large number and, at the same time ensure against blockage of the throughflow path by entrained grit or the like, the units may become of unmanageable size or uneconomic cost.

Furthermore, and in order to accommodate the large number of resistance elements, the entire cylindrical surface area of the emitter unit must be utilised and this gives rise to considerable difficulties in production. Thus molds which have at least four-fold openings are required and, in addition, compromises in resistance element construction are adopted which render some of the resistance elements substantially ineffective.

These disadvantages inherent in the hitherto proposed units are substantially reduced or avoided with the specific configuration in accordance with the present invention.

Various embodiments of emitter units in accordance with the present invention will now be described by way of example and with reference to the accompanying drawings in which, FIG. 1 is a schematic representation of a basic emitter flowpath in accordance with the invention, FIG. 2 is a longitudinally sectioned view of one embodiment of emitter unit in accordance with the invention, FIG. 3 is a side elevation of an inner component of the unit shown in FIG. 2, FIG. 4 is a cross-sectional view of the component shown in FIG. 3 taken along the line IV—IV, FIG. 5 is a plan view of a component of a further form of emitter unit in accordance with the invention, FIG. 6 is a longitudinally sectioned view of the component shown in FIG. 5, FIG. 7 shows the component shown in FIGS. 5 and 6 assembled on an irrigation pipe, FIG. 8 is a cross-sectional view of a further embodiment of emitter unit in accordance with the invention assembled on an irrigation pipe, FIG. 9 is a plan view of a component of the unit shown in FIG. 8, FIG. 10 is a cross-sectional view of a still further embodiment of emitter unit in accordance with the invention assembled on an irrigation pipe, FIG. 11 is a perspective partially schematic, view of a component of the unit shown in FIG. 10, FIG. 12 is a longitudinally sectioned view of yet another embodiment of an emitter unit in accordance with the present invention shown coupled to an irrigation pipe, FIG. 13 is a plan view from above of a body member forming part of the emitter unit shown in FIG. 12, and FIG. 14 is a plan view from below of said body member.

In the schematic construction shown in FIG. 1 an emitter flowpath is defined between a base wall 11, a pair of substantially parallel, spaced apart ribs 12a and 12b (of width b) and a cover wall (not shown) spaced from the base wall 11 and contiguous with the ribs 12a and 12b. Formed integrally with the ribs 12a and 12b and projecting therefrom into the flowpath in respectively opposite directions are two sets of tooth shaped baffles 13a and 13b. The disposition of the baffles of each set is such that the baffles of one set are directed towards the inter-baffle regions of the opposite set (in the embodiment shown the baffle tips of one set are disposed substantially equidistantly from the adjacent baffle tips of the opposite set). Furthermore the baffle tips of the two sets are substantially aligned.

Each baffle is spaced from the adjacent baffle by a spacing $\Delta$ and from the opposite rib by a spacing $\Delta_1$ or $\Delta_2$. In the illustrated example $\Delta=\Delta_1=\Delta_2$ and therefore the spacing between the ribs 12a and $12b = \Delta_1 + \Delta_2 = 2\Delta$.

Each baffle 13 is of triangular tooth shaped construction having an apical width $\xi$, the walls of the baffle makes angles of $\alpha$ and $\beta$ respectively with the vertical.

There is defined a unitary area element 14 of the flowpath which comprises the area of the path between an adjacent pair of baffles (13a and 13b) constituting adjacent resistance elements and the effective areas occupied by those portions of the pair of baffles in direct contact with the flow in this area element. This area element has an area $\delta a$.

Each baffle merges with its associated rib via a region having a radius of curvature R which is not greater than $\Delta$.

Where, as in the figure,
$\alpha = \beta$ then $$\delta a = \left( \frac{\Delta}{\cos\alpha} + \xi \right) (\Delta_3 + b)$$

Where, as in the present case $2\alpha$ ranges between 10°-35°, (a range indicated by the requirement for $\delta a$ to be a minimum and $\delta k$ to be a maximum), $\cos \alpha$ is relatively insensitive to variations in $\alpha$. Thus whilst it is desirable to reduce $\alpha$ to a minimum consistent with retaining adequate mechanical strength for the baffle, the major influence in reducing $\delta a$ (bearing in mind that $\Delta$ and $\Delta_3$ should be kept as high as possible and b is determined by mechanical constructional considerations) is the reduction in $\xi$.

As indicated above the relationship between $\xi$ and $\Delta$ is given by
$0 < \xi < 0.25\Delta$
with the practical optimum being where $\xi \approx 0.1\Delta$.

As indicated above the tips of each flowpath stretch (constituted by at least three baffles) are substantially aligned, i.e. $\Delta_3 = \Delta_1 + \Delta_2$. Any significant deviation from this requirement, i.e. when $\Delta_3$ is significantly less than $\Delta_1 + \Delta_2$ (a free flowpath between opposite tips) or when $\Delta_3$ is significantly greater than $\Delta_1 + \Delta_2$ (successive, oppositely directed baffles overlap) leads to a significant reduction in the K value (as defined above) which is obtainable.

Reference will now be made to FIGS. 2 to 14 of the drawings in which are illustrated various practical embodiments of emitter units incorporating the essential features of the invention.

FIGS. 2 and 3 illustrate an emitter unit of the kind which is generally disclosed in U.S. Pat. No. 3,604,728 and which is generally referred to as an "in-line" emitter unit. Such a unit comprises outer and inner coaxial members 21 and 22 which interfit as shown in FIG. 2 of the drawings and which are formed, at respective opposite ends thereof, with coupling pieces 23 and 24 designed to be inserted in successive lengths of irrigation tubing (not shown).

As with in-line emitter units of the kind disclosed in the U.S. Pat. No. 3,604,728, water flows through the irrigation pipe in which the unit is connected and a portion thereof is diverted, as shown by the arrow 25 and passes through a flowpath defined between the adjacent walls of the inner and outer members 21 and 22 and emerges therefrom as a pressureless drip in the direction of the arrow 26.

The flowpath followed by the water is defined, inter alia, by a labyrinthine structure as shown in FIG. 3 of the drawings.

The tubular inner member 22 has formed on its outside wall two sets (only one being visible) of peripheral ribs 31, the ribs 31 of each set being axially spaced along the length of the inner tubular member 22 and extending alternatingly from a pair of axial end ribs 22. In this way the flowpath defined through the emitter is subdivided into two sets of flowpath components, each component being defined between an adjacent pair of peripheral ribs 31, successive components communicating with each other via a communicating flowpath 33 between the end of an intermediate peripheral rib 31 and the adjacent axial rib 32.

Between each pair of adjacent, axial end ribs 32 is formed an axial barrier rib 34, the ends of one of which are spaced from the extreme peripheral end ribs 31a so as to allow for water flow therearound in the direction of the arrows 35, the other of which is formed integrally at its ends with the extreme peripheral ribs 31a.

Each pair of peripheral ribs 31 is respectively formed with two sets of oppositely directed baffle teeth 36, the teeth 36 of one set being directed into the inter-teeth region of the opposite set and being equidistantly spaced from the teeth of the other set, the tips of the teeth 36 of the two sets being substantially aligned. Each tooth 36 has an apical width which is substantially 0.1 times the minimum spacing $\Delta$ between teeth 36 said minimum spacing $\Delta$ corresponding to the teeth height and to double the spacing between adjacent peripheral ribs 31.

It will be appreciated that in the particular construction just described two sets of component flowpaths have been formed at respectively opposite, peripheral portions of the tubular component whilst the axial portions therebetween are left substantially free apart from the axial ribs 34. This construction facilitates the production of the inner tubular component using a two-piece injection mold. It is found in practice that such a construction provides for enough resistance elements to ensure effective production of a pressureless driplike output with minimal area and maximum spacing between teethlike barriers thereby minimising dangers of blockage. It will be realised however that, in principle there would be no fundamental difficulty in continuing the mazelike flowpath structures around the full periphery of the inner tubular member though this could introduce considerable production problems.

In the construction shown in FIGS. 5 to 7 of the drawings a flexible rectangular strip 41 has formed thereon a plurality of transverse ribs 42 provided with sets of teeth 43 (of the kind illustrated with reference to FIGS. 1 to 5 of the drawings) and defining component flowpaths 46 as shown schematically in FIG. 6 of the drawings. The plastic strip is provided with a tubular inlet nipple 47 and with a pair of complementary terminal coupling elements 48.

The strip 41 is bent around an irrigation pipe 49 with its inlet nipple 47 inserted within an outlet aperture formed in the pipe 49 and with its coupling elements 48 welded as shown in FIG. 7 of the drawings. In consequence a portion of the water flowing through the pipe 49 is diverted through the nipple 47 and into the meandering flowpath 46 defined in the striplike member 41 and emerges therefrom as a pressureless drip.

In an alternative embodiment, shown in FIGS. 8 and 9 of the drawings, the emitter unit comprises an outer boxlike casing 51 which is open at the top and provided with peripheral elastic retaining rim 52 and is formed at its base 53 with an apertured inlet nipple 54 by means of which the casing 51 can be coupled, as shown, to an irrigation pipe 55. An emitter body unit 56 is adapted to be fitted within the casing 51 and, as shown clearly in FIG. 9 of the drawings, is formed with a meandering groove 57 the successive rectilinear portions 57a thereof constituting component flowpath portions. The groove 57 is formed, as before, with baffle teeth 58 whose dimensions and location correspond with the requirements in accordance with the present invention. One end 59 of the groove 57 constituting an inlet end communicates with the inlet nipple 54 and the other end 60 of the groove constituting an outlet end communicates with an outlet 61. Water flowing through the irrigation pipe 49 is partially diverted through the nipple 54 into the emitter unit flowing around the meandering groove 57 and, as a consequence of successive directional changes, has its pressure successively reduced until it emerges from the outlet 61 as a substantially pressureless drip.

In the embodiment shown in FIGS. 10 and 11 of the drawings there is once more illustrated a casing 63, of rectangular shape which is adapted to be fitted to and communicate with an irrigation pipe 64 via a centrally formed, apertured nipple 65 which fits into the pipe 64, the casing 63 being open at the top and being formed with a flexible retaining peripheral rim 66. In the present case however, the base 67 of the casing 63 as well as the underside of an emitter body 68 is each formed with a meandering groove 69 this being best seen from the view of the emitter body 68 in FIG. 11 of the drawings. As seen in that Figure the meandering groove 69 is defined by transverse ribs 70 between which extend, for the whole width of the groove, tooth shaped baffles 71 of substantially triangular cross-section. The grooves and rib construction formed on the base of the casing member is in effect the mirror image of that formed in the body member shown in FIG. 11 of the drawings. Thus when the body member 68 is inserted into the casing 63 face downwards, the ribs of the casing and of the body member are in sealing contact. However, the tooth shaped baffles 71 of the casing 63 are staggered with respect to the tooth shaped baffles 71 of the body member 68 so that the tip of a baffle 71 of the body member is directed towards an intermediate position of the tips of adjacent baffles 71 of the casing 68. The inlet nipple 65 communicates with an inner aperture formed in a groove of the casing 63 whilst an outlet 72 from the emitter unit communicates with the outlet 73 formed in the body member.

The dimensions of the tooth shaped baffles 71 and their location with respect to each other fulfill the basic requirements in accordance with the present invention and the portion of the water flowing through the pipe 64 diverted through the nipple 65 into the flowpath defined between the casing and body member follows a sinusoidal labyrinthine path so as to emerge, from the emitter as a substantially pressureless drip.

It is to be pointed out, with respect to the embodiment just described with reference to FIGS. 10 and 11 of the drawings that, whilst, in common with the other embodiments, pressure reduction is effected as a result of successive changes of direction introduced into the flowpath by baffle members whose dimensions and dispositions are determined in accordance with the principles of the present invention, whereas in the previously described embodiments the sinusoidal flowpath was always substantially parallel to the wall of the member in which the groove or the like was formed, in the embodiment shown in FIGS. 10 and 11 of the drawings the sinusoidal flowpath is directed substantially normal to the wall of the member and the main direction of flow. In view of the fact that these directional changes occur substantially normally to the walls of the device it is clearly possible to achieve a very substantially higher number of changes, per unit area of the device, than is the case with the previous embodiments where the directional changes are effected laterally to the walls of the device and this merely at the expense of increasing the height of the device. In consequence, and added to the already considerable advantages inherent in the provision of baffles in accordance with the present invention, the specific embodiment now described and other embodiments based on the principle of directional changes normal to the walls of the device allow for a still greater increase in the number of directional changes.

Reference will now be made to FIGS. 12 to 14 of the drawings which illustrate the application of the invention to an emitter unit adapted to be coupled as a so-called "branch dripper" to an existing pipe.

The emitter unit comprises a casing 81 and a body member 82.

The casing consists of a cylindrical cap member 83 open at the base and formed in its upper surface with a centrally located outlet port 84. The casing furthermore comprises a receiving cup 85 which fits into the cap member 83 and is retained in position by a resiliently distortable, inwardly directed, peripheral rib 86. The receiving cup 85 is integrally formed with a barbed coupling nipple 87 having a throughgoing bore 88 communicating with the interior of the casing 81 and by means of which the emitter unit can be coupled, as shown, to an irrigation pipe 89.

The disc-like body member 82 is formed on both sides thereof with central recesses 90a and 90b respectively surrounded by substantially circular grooves 91a and 91b, these grooves being provided with baffles 92 of the kind disclosed above.

The central recess 90a communicates with an inlet end of the groove 91a via an inlet groove 13a whilst an outlet end of the groove 91b communicates with the central recess 10b via an outlet groove 93b.

An outlet end of the groove 91a communicates with an inlet end of the groove 91b via an aperture 94 which extends through the body member 82.

As seen in FIG. 12 of the drawings the body member 82 is sandwiched between the cup-like member 85 and the cap-like member 83 so that the grooves 91a and 91b define with the adjacent surfaces of the cup-like member and cap respective flowpaths. The central recess 90a communicates with the troughgoing bore 88 in the coupling nipple 87 whilst the central recess 90b communicates with the outlet port 84.

In use, and with the emitter unit coupled to an irrigation pipe as shown, water flowing through the irrigation pipe at a relatively substantial flow rate and pressure has a portion thereof tapped off into the emitter unit and flows first through the flowpath 91a and then through the flowpath 91b emerging via the outlet port 84 as a drip.

It will be readily seen that with the construction just described it is possible to achieve a substantially long flowpath with consequent substantial reduction in outflow rate without reducing the minimum throughflow spacing in the emitter (thus minimising the danger of blockage) and without increasing the overall diameter of the emitter. Furthermore, the construction just described allows for the use, with casings of standard dimensions, body members having throughflow paths of differing dimensions and in this way differing outflow rates can be readily achieved.

In one characteristic construction of an emitter unit of the kind illustrated in FIGS. 12 to 14 of the drawings the following parameter magnitudes were employed.

| | |
|---|---|
| Tooth width ($\xi$) | = 0.15 mm |
| Tooth angle $\alpha = \beta$ | = 15° |
| Minimum spacing ($\Delta$) = tooth height | = 1.05 mm |
| Annular width of grooves (91a, 91b) | = 2.1 mm |
| Spacing between successive teeth of same set | = 1.05 mm |
| Number of teeth (n) | = 40 |
| Diameter of emitter body member (82) | = 13 mm |
| Output flow rate (q) | = 3.9 l/n |
| K value for emitter | = 203 |
| $\delta k$ | = 5.07 |

I claim:

1. An emitter unit comprising wall means for defining an elongated flowpath, an inlet and an outlet for said unit, means for coupling the unit to an irrigation installation, two sets of oppositely directed baffles projecting into said flowpath, characterized in that each baffle is of substantially triangular shape and terminates in a narrowed baffle tip of a width $\xi$ where $0 < \xi < 0.25\Delta$ where $\Delta$ is the minimum throughflow spacing in the emitter, the baffles of one set being respectively directed towards the inter-baffle regions of the opposite set, the tip of each baffle being substantially aligned with the tips of the opposite pair of adjacent baffles.

2. An emitter unit according to claim 1 wherein $\xi$ is substantially equal to $0.1\Delta$.

3. An emitter unit according to claim 1 wherein said baffles are each substantially of length $\Delta$.

4. An emitter unit according to claim 1 wherein the triangular walls of each baffle define between them an angle which lies between 10° and 35°.

5. An emitter unit according to claim 4 wherein said wall means include at least one pair of spaced apart ribs from which said baffle sets respectively extend and wherein the bases of said baffles are formed integrally with said ribs and have apical widths equal to $\xi$.

6. An emitter unit according to claim 1 wherein said flowpath comprises a plurality of substantially rectilinear flowpath sections which communicate with each other and which inpart a labyrinthine configuration to said flowpath.

7. An emitter unit according to claim 6 and comprising a pair of coaxial interfitting tubular members between which said flowpath is defined.

8. An emitter unit according to claim 7 wherein said flowpath is defined between successive peripheral ribs formed on an outer wall of an inner tubular member and axially spaced along the length thereof and an inner wall of an outer tubular member.

9. An emitter unit according to claim 8 wherein several sets of said peripheral ribs are provided, each set extending between a pair of axial ribs, said sets communicating with one another.

10. An emitter unit according to claim 7 wherein an outer tubular member is constituted by a flexible sheet which is adapted releasably to surround an inner tubular member.

11. An emitter unit according to claim 1 and comprising a casing member and a body member adapted to be fitted therein, said flowpath being defined by grooves formed in one or both of the adjacent faces of said members.

12. In an emitter unit for drip irrigation comprising a water inlet adapted to be subjected to high water pressure, a water outlet from which water is adapted to flow in a substantially pressureless drip, and wall means defining an elongated water flowpath extending between said inlet and said outlet, the improvement comprising:

pressure drop means disposed along said flowpath to achieve substantial reduction in outflow rate without reducing the minimum throughflow spacing and without increasing the overall size of the emitter, and to maximize the efficiency of pressure drop while minimizing the length of said flowpath, said pressure drop means comprising a plurality of segments of generally rectilinear or gently curved flowpath of substantially rectangular cross section and defined by said wall means, each said flowpath segment containing a plurality of pairs of baffles projecting from opposite sides of said wall means, each said baffle extending substantially perpendicular to the length of the flowpath segment, oppositely facing baffles being staggered so that the baffles projecting from one side of the wall means are directed toward the interbaffle regions of the baffles projecting from the opposite side of the wall means with the tips of said baffles being located along approximately the centerline of the flowpath, each said baffle being tapered toward its tip at an angle of 10°–35°, the width of each baffle tip being less than 0.25 of the minimum width of the flowpath, and said baffle merging with its associated wall by a curvature having a radius less than the minimum width of the flowpath.

13. An emitter unit according to claim 12, wherein the baffle tip width is approximately 0.1 of the minimum width of the flowpath.

14. An emitter unit comprising wall means for defining an elongated flowpath, an inlet and an outlet for said unit, means for coupling the unit to an irrigation installation, two sets of oppositely directed baffles projecting into said flowpath, characterised in that each baffle terminates in a baffle tip of a width $\xi$ where $0 < \xi < 0.25\Delta$ where $\Delta$ is the minimum throughflow spacing in the emitter, the baffles of one set being respectively directed towards the inter-baffle regions of the opposite set, the tip of each baffle being substantially aligned with the tips of the opposite pair of adjacent baffles, and the unit comprises a casing member and a body member adapted to be fitted therein, said flowpath being defined by grooves formed in both of the adjacent faces of said members, and wherein said baffles extend across said grooves, the baffles of one member being staggered with respect to the baffles of the other 15. An emitter unit comprising wall means for defining an elongated flowpath, an inlet and an outlet for said unit, means for coupling the unit to an irrigation installation, two sets of oppositely directed baffles projecting into said flowpath, characterised in that each baffle terminates in a baffle tip of a width $\xi$ where $0 < \xi < 0.25\Delta$ where $\Delta$ is the minimum throughflow spacing in the emitter, the baffles of one set being respectively directed towards the inter-baffle regions of the opposite set, the tip of each baffle being substantially aligned with the tips of the opposite pair of adjacent baffles, and the unit comprises a casing member and a body member adapted to be fitted therein, said flowpath being defined by grooves formed in one or both of the adjacent faces of said members, the opposite faces of said body member having formed therein respective grooves which define, with said casing, a pair of said flowpaths, a coupling nipple of said unit communicating with an inet end of one flowpath, an outlet port of said unit communicating with an outet end of the other flowpath, and a thoroughgoing aperture formed in said member through which communicate an outlet end of said one flowpath and an inlet end of said other flowpath.

16. An emitter unit according to claim 15 wherein said flowpaths respectively surround inlet and outlet recesses formed in said body member.

17. An emitter unit according to claim 15 wherein said casing is constituted by a cap member in which is formed said outlet port and a cup member received by said cap member and formed integrally with said coupling nipple, said body member being retained between said cap and cup members.

18. In a method for minimizing the number of baffles that introduce fluid friction in a flow path of a dripper unit so as to produce a non-pressurized drip at the outlet of the flow-path for a given pressure at the inlet, a given flow rate and a given through-flow spacing between the baffles, the improvement comprising:
 (a) providing two sets of oppositely directed triangular shaped baffles projecting into said flowpath wherein the baffles of one set are respectively directed towards the inter-baffle regions of the opposite set, the tip of each baffle being substantially aligned with the tips of the opposite pair of adjacent baffles; and
 (b) establishing the width of the tips of the baffles such that the ratio of tip width to through-flow spacing is less than 0.25.

19. A dripper unit comprising:
 (a) means defining a flow-path having an inlet and an outlet;
 (b) two sets of oppositely directed triangular shaped baffles projecting into said flowpath, the baffles of one set being respectively directed towards the inter-baffle regions of the opposite set, and the tip of each baffle being substantially aligned with the tips of the opposite pair of adjacent baffles;
 (c) said baffles introducing fluid friction into said flowpath so as to produce a non-pressurized drip at the outlet of the flow-path for a given pressure at the inlet, a given flow-rate, and given through-flow spacing between the baffles; and
 (d) the ratio of the width of the tip of the baffles to the through-flow spacing being less than 0.25.

* * * * *